(12) United States Patent
Xie et al.

(10) Patent No.: US 11,223,291 B2
(45) Date of Patent: Jan. 11, 2022

(54) BIPOLAR BIDIRECTIONAL DC CONVERTER, AND CONTROL METHOD AND CONTROL DEVICE THEREFOR

(71) Applicants: NR ELECTRIC CO., LTD., Jiangsu (CN); NR ENGINEERING CO., LTD., Jiangsu (CN)

(72) Inventors: Chen Xie, Jiangsu (CN); Zhongfeng Zhang, Jiangsu (CN); Jie Tian, Jiangsu (CN); Yeyuan Xie, Jiangsu (CN); Haiying Li, Jiangsu (CN); Yu Wang, Jiangsu (CN); Jian Ge, Jiangsu (CN)

(73) Assignees: NR ELECTRIC CO., LTD., Nanjing (CN); NR ENGINEERING CO., LTD., Nanjing (CN)

( * ) Notice: Subject to any disclaimer, the term of this patent is extended or adjusted under 35 U.S.C. 154(b) by 0 days.

(21) Appl. No.: 17/268,536

(22) PCT Filed: Aug. 15, 2019

(86) PCT No.: PCT/CN2019/100792
§ 371 (c)(1),
(2) Date: Feb. 15, 2021

(87) PCT Pub. No.: WO2020/038275
PCT Pub. Date: Feb. 27, 2020

(65) Prior Publication Data
US 2021/0242792 A1  Aug. 5, 2021

(30) Foreign Application Priority Data
Aug. 21, 2018  (CN) .......................... 201810952977.1

(51) Int. Cl.
*H02M 3/335* (2006.01)
*H02M 7/487* (2007.01)
*H02M 1/32* (2007.01)

(52) U.S. Cl.
CPC ....... *H02M 3/33584* (2013.01); *H02M 1/325* (2021.05); *H02M 7/487* (2013.01)

(58) Field of Classification Search
CPC ......... H02M 3/33569; H02M 3/33584; H02M 7/487
(Continued)

(56) References Cited

U.S. PATENT DOCUMENTS

| 8,934,268 B2 | 1/2015 | Trainer et al. |
| 2007/0236965 A1 | 10/2007 | Chen et al. |

(Continued)

FOREIGN PATENT DOCUMENTS

| CN | 102694477 A | 9/2012 |
| CN | 102938560 A | 2/2013 |

(Continued)

OTHER PUBLICATIONS

Chinese Application No. 201810952977.1, First Office Action and Search Report dated Feb. 3, 2020, 5 pages.
(Continued)

*Primary Examiner* — Gary A Nash
(74) *Attorney, Agent, or Firm* — Enshan Hong; MagStone Law, LLP (57) ABSTRACT

A bipolar bidirectional DC converter comprises at least two valve group series (101, 102) and at least six magnetic elements (103), and said valve group series are divided into a Type-I valve group series (102) and a Type-II valve group series (101) each valve group series (101, 102) comprises a high-voltage DC port, a low-voltage DC port and at least three AC ports, and each AC port is connected to a magnetic element (103); and the other ends of the magnetic elements (103), which are connected to all the AC ports in the same valve group series (101, 102), are connected.

20 Claims, 5 Drawing Sheets

(58) Field of Classification Search
USPC .................................................. 363/35, 132
See application file for complete search history.

(56) References Cited

U.S. PATENT DOCUMENTS

| | | | | |
|---|---|---|---|---|
| 2014/0198533 A1* | 7/2014 | Bala | .................... | H02M 7/4837 363/16 |
| 2015/0180350 A1* | 6/2015 | Huang | .............. | H02M 3/33507 307/66 |

FOREIGN PATENT DOCUMENTS

| | | | | |
|---|---|---|---|---|
| CN | 103117666 | A | | 5/2013 |
| CN | 104682430 | A | | 6/2015 |
| CN | 105048813 | A | | 11/2015 |
| CN | 103219738 | A | | 8/2016 |
| CN | 106505899 | A | * | 3/2017 |
| CN | 106787877 | A | * | 5/2017 |
| CN | 107370392 | A | | 11/2017 |
| CN | 108123598 | A | | 6/2018 |
| CN | 207542996 | A | | 6/2018 |
| CN | 108242896 | A | | 7/2018 |
| CN | 108347051 | A | | 7/2018 |
| CN | 109039702 | A | | 12/2018 |
| RU | 96107341 | A | | 6/1998 |

OTHER PUBLICATIONS

Chinese Application No. 201810952977.1, Second Office Action and Search Report dated Jun. 11, 2020, 6 pages.
Indian Application No. 202117009481, Examination Report dated May 27, 2021, 7 pages.
Russian Application No. 2021105725/07, Examination Report dated Jul. 28, 2021, 7 pages.

* cited by examiner

BIPOLAR BIDIRECTIONAL DC CONVERTER, AND CONTROL METHOD AND CONTROL DEVICE THEREFOR

RELATED APPLICATIONS

This is a U.S. national stage of international application No. PCT/CN2019/100792 filed on Aug. 15, 2019, which claims priority to Chinese Patent Application No. 201810952977.1, filed with the China National Intellectual Property Administration (CNIPA) on Aug. 21, 2018, the entire content of which is incorporated herein by reference.

TECHNICAL FIELD

The present application belongs to the field of power electronic applications, and relates to DC power grids and bidirectional DC converters, in particular to a bipolar bidirectional DC converter, and a control method and a control device therefor.

BACKGROUND

As an important component for realizing voltage conversion in a DC power grid, bidirectional DC converters have attracted more and more attention from scholars in the field of DC power grids. In high-voltage DC conversion occasions, due to the stress and cost of switch tubes, the bidirectional DC converters for such applications are mostly of ISOP and ISOS structures or in the form of power conversion devices based on a MMC back-to-back structure, wherein the power conversion devices based on the MMC back-to-back structure are more suitable for power conversion between high to high/medium voltage DC power supply systems.

In order to reduce the insulation stress to ground of a DC power supply system, bipolar connection is generally adopted for a DC bus of the system, that is, the isolation voltage to ground between the positive and negative electrodes of the DC bus is half of the voltage across the positive and negative electrodes. Generally, there are two types of bipolar connection: pseudo-bipolar connection and true-bipolar connection. In the pseudo-bipolar connection mode, when one electrode of the bus of the DC system is out of service, the other electrode will be out of service too. However, in the true-bipolar connection mode, when one electrode of the bus of the DC system is out of service, the operation of the other electrode will not be affected. The MMC back-to-back structure is an isolated type bidirectional DC converter, which can, through combination, easily realize the bidirectional transmission of power between DC bus under different bus connection modes such as pseudo-bipolar connection and true-bipolar connection.

However, the MMC back-to-back structure comprises two MMC converter valve groups and a high-power frequency or intermediate frequency AC transformer, so the construction cost is relatively high. A bidirectional DC converter with an AUTO-DC structure which is evolved from the MMC back-to-back structure has been studied. The principle of this converter is similar to that of an AC autotransformer, and it is a non-isolated bidirectional DC converter. Compared with the MMC back-to-back structure, it can reduce the capacity of the AC transformer and the converter valve group, and is suitable for occasions with low requirements for isolation. However, the AUTO-DC structure is a non-isolated circuit and is obtained by direct reference to the AC autotransformer, thus unable to be directly applied in a bipolar system. For example, when a DC bus of a high-voltage side port adopts pseudo-bipolar connection, a negative electrode or positive electrode of a low-voltage side port will be the same point as a negative electrode or positive electrode of the high-voltage side port after conversion through the AUTO-DC structure, so its isolation voltage to ground will become half of the voltage across the positive and negative electrodes of the high-voltage side, thus increasing the insulation stress to ground of a low-voltage side of equipment.

Patent CN105048813A has optimized the AUTO-DC structure to realize the power conversion between DC power supply systems with a pseudo-bipolar DC bus at a high-voltage side and a pseudo-bipolar DC bus at a low-voltage side. However, in an actual DC system, when a high-voltage side DC bus is of a pseudo-bipolar connection type and a low-voltage side DC bus is of a true-bipolar connection type, the two ends of a low-voltage side port can only be connected to the positive and negative electrodes of the low-voltage DC bus when adopting the scheme of Patent CN105048813A; and when one electrode of the low-voltage side bus is out of service, the whole system has to stop because the scheme does not provide the other electrode to form a neutral point circuit.

SUMMARY OF THE INVENTION

In view of this, the embodiments of the present application provide a bipolar bidirectional DC converter, comprising at least two valve group series which are distinguished according to the connection relationship between the valve group series and a low-voltage side port of the bidirectional DC converter, and comprising at least two valve group series and at least six magnetic elements, wherein the valve group series are divided into a Type-I valve group series and a Type-II valve group series according to the connection relationship between the valve group series and the low-voltage side port of the bidirectional DC converter; a positive electrode of a low-voltage DC port of the Type-I valve group series forms a positive electrode of the low-voltage side port of the bipolar bidirectional DC converter; a positive electrode of a low-voltage DC port of the Type-II valve group series is connected to a negative electrode of the low-voltage DC port of the Type-I valve group series and forms a neutral point of the low-voltage side port of the bipolar bidirectional DC converter, and a negative electrode of the low-voltage DC port of the Type-II valve group series forms a negative electrode of the low-voltage side port of the bipolar bidirectional DC converter; each valve group series comprises a high-voltage DC port, a low-voltage DC port and at least three AC ports, positive electrodes of all the high-voltage DC ports are connected to serve as a positive electrode of a high-voltage side port of the bipolar bidirectional DC converter, and negative electrodes of all the high-voltage DC ports are connected to serve as a negative electrode of the high-voltage side port of the bipolar bidirectional DC converter; and each AC port is connected to a magnetic element, and the other ends of the magnetic elements, which are connected to all the AC ports in the same valve group series, are connected.

According to some embodiments, the bipolar bidirectional DC converter further comprises first isolating switches, second isolating switches, a third isolating switch, a fourth isolating switch, a fifth isolating switch and a sixth isolating switch, wherein the first isolating switches are connected between the positive electrodes of the high-voltage DC ports of the valve group series and a positive side of a high-voltage DC bus; the second isolating switches are connected between the negative electrodes of the high-voltage DC ports of the valve group series and a negative side of the high-voltage DC bus; the third isolating switch is connected between the positive electrode of the low-voltage DC port of the Type-I valve group series and a positive side of a low-voltage DC bus; the fourth isolating switch is connected between a negative electrode of the low-voltage DC port of the Type-I valve group series and a neutral point of the low-voltage DC bus; the fifth isolating switch is connected between the positive electrode of the low-voltage DC port of the Type-II valve group series and the neutral point of the low-voltage DC bus; and the sixth isolating switch is connected between the negative electrode of the low-voltage DC port of the Type-II valve group series and a negative electrode of the low-voltage DC bus.

According to some embodiments, the magnetic elements are reactors.

According to some embodiments, the magnetic elements are AC transformers.

According to some embodiments, each valve group series comprises voltage source converters, the number of which is the same as that of the AC ports of the valve group series, the voltage source converter comprises an AC-DC conversion circuit, and the AC-DC conversion circuit at least comprises an AC port and a DC port.

According to some embodiments, the DC ports of all the voltage source converters in the valve group series are connected in series end to end, a positive electrode of the DC port of the first voltage source converter is the positive electrode of the high-voltage DC port of the valve group series, a negative electrode of the DC port of the last voltage source converter is the positive electrode of the high-voltage DC port of the valve group series, and all the AC ports are the AC ports of the valve group series.

According to some embodiments, positive electrodes of the DC ports of two voltage source converters of the valve group series are led out to serve as the low-voltage DC port of the valve group series, wherein the positive electrode with higher voltage is taken as a positive side of the low-voltage DC port, and the positive electrode with lower voltage is taken as a negative side of the low-voltage DC port; for the Type-I valve group series, the selected negative side has the same potential as a neutral point of a high-voltage side DC bus; and for the Type-II valve group series, the selected positive side has the same potential as the neutral point of the high-voltage side DC bus.

Optionally, negative electrodes of the DC ports of two voltage source converters of the valve group series are led out to serve as the low-voltage DC port of the valve group series, wherein the negative electrode with higher voltage is taken as the positive side of the low-voltage DC port, and the negative electrode with lower voltage is taken as the negative side of the low-voltage DC port; for the Type-I valve group series, the selected negative side has the same potential as the neutral point of the high-voltage side DC bus; and for the Type-II valve group series, the selected positive side has the same potential as the neutral point of the high-voltage side DC bus.

According to some embodiments, the voltage source converter comprises at least four valve arms divided into two groups, with every two valve arms being connected in series, wherein each valve arm comprises a valve arm reactor and a power module which are connected in series, two ends of each group of valve arms connected in series in the vertical direction are connected in parallel to serve as the DC port of the voltage source converter, and midpoints of each group of valve arms connected in series in the vertical direction are led out to serve as the AC port of the voltage source converter.

According to some embodiments, the power module comprises a half-bridge plus capacitor structure.

Optionally, the power module comprises a full-bridge plus capacitor structure.

Optionally, the power module comprises a full-bridge plus capacitor structure and a half-bridge plus capacitor structure.

The embodiments of the present application also provide a control method for the bipolar bidirectional DC converter as described above, which comprises: during normal operation, closing the isolating switches connected to the positive electrodes and negative electrodes of the high-voltage DC ports and low-voltage DC ports of all the valve group series.

According to some embodiments, the method further comprises: detecting a first potential difference between the positive electrode of the low-voltage DC port and the negative electrode of the low-voltage DC port of the Type-I valve group series; when the first potential difference deviates from a first target value, adjusting the power transmitted through the magnetic elements by the voltage source converters of the Type-I valve group series till the first potential difference is equal to the first target value, wherein the voltage source converters are located between the positive electrode of the low-voltage DC port and the negative electrode of the low-voltage DC port of the Type-I valve group series or between the positive electrode of the low-voltage DC port and the positive electrode of the high-voltage DC port of the Type-I valve group series; detecting a second potential difference between the negative electrode of the low-voltage DC port and the negative electrode of the high-voltage DC port of the Type-I valve group series; and when the second potential difference deviates from a second target value, adjusting the power transmitted through the magnetic elements by the voltage source converters of the Type-I valve group series till the second potential difference is equal to the second target value, wherein the voltage source converters are located between the positive electrode of the low-voltage DC port and the negative electrode of the low-voltage DC port of the Type-I valve group series or between the negative electrode of the low-voltage DC port and the negative electrode of the high-voltage DC port of the Type-I valve group series.

According to some embodiments, the first target value is half of a reference value of a positive and negative side voltage of a low-voltage DC port of the bipolar bidirectional DC converter, and the second target value is half of a reference value of a positive and negative side voltage of a high-voltage DC port of the bipolar bidirectional DC converter.

According to some embodiments, the method further comprises: detecting a third potential difference between the positive electrode of the low-voltage DC port and the negative electrode of the low-voltage DC port of the Type-II valve group series; when the third potential difference deviates from a third target value, adjusting the power transmitted through the magnetic elements by the voltage source converters of the Type-II valve group series till the third potential difference is equal to the third target value, wherein the voltage source converters are located between the positive electrode of the low-voltage DC port and the negative electrode of the low-voltage DC port of the Type-II valve group series or between the negative electrode of the low-voltage DC port and the negative electrode of the high-voltage DC port of the Type-II valve group series;

detecting a fourth potential difference between the negative electrode of the low-voltage DC port and the negative electrode of the high-voltage DC port of the Type-II valve group series; and when the fourth potential difference deviates from a fourth target value, adjusting the power transmitted through the magnetic elements by the voltage source converters of the Type-II valve group series till the fourth potential difference is equal to the fourth target value, wherein the voltage source converters are located between the positive electrode of the low-voltage DC port and the negative electrode of the low-voltage DC port of the Type-II valve group series or between the positive electrode of the low-voltage DC port and the positive electrode of the high-voltage DC port of the Type-II valve group series.

According to some embodiments, the third target value is half of the reference value of the positive and negative side voltage of the low-voltage DC port of the bipolar bidirectional DC converter, and the fourth target value is half of the reference value of the positive and negative side voltage of the high-voltage DC port of the bipolar bidirectional DC converter.

According to some embodiments, the method further comprises: when the high-voltage DC bus has a short-term failure, adjusting the switching state of the power modules composed of the full-bridge plus capacitor structures in all the valve group series; and after the failure is repaired, restoring the switching state of the modules.

According to some embodiments, the method further comprises: when a positive side of the low-voltage side DC bus has a short-term failure to ground or the neutral point, adjusting the switching state of the power modules composed of the full-bridge plus capacitor structures of the voltage source converters between the low-voltage DC ports in all the Type-I valve group series; and after the failure is repaired, restoring the switching state of the modules.

According to some embodiments, the method further comprises: when a negative side of the low-voltage side DC bus has a short-term failure to ground or the neutral point, adjusting the switching state of the power modules composed of the full-bridge plus capacitor structures of the voltage source converters between the low-voltage DC ports in all the Type-II valve group series; and after the failure is repaired, restoring the switching state of the modules.

According to some embodiments, the method further comprises: when the positive side of the low-voltage side DC bus has a permanent failure to ground or the neutral point, locking the Type-I valve group series, and opening the isolating switches or full-control switches connected to the positive electrodes and the negative electrodes of the high-voltage DC port and the low-voltage DC port of the Type-I valve group series to isolate the failure; and keeping the working state of the Type-II valve group series unchanged, and continuing to complete the electric energy conversion from the high-voltage DC bus to the negative side and neutral point of the low-voltage DC bus.

According to some embodiments, the method further comprises: when the negative side of the low-voltage side DC bus has a permanent failure to ground or the neutral point, locking the Type-II valve group series, and opening the isolating switches or full-control switches connected to the positive electrodes and the negative electrodes of the high-voltage DC port and the low-voltage DC port of the Type-II valve group series to isolate the failure; and keeping the working state of the Type-I valve group series unchanged, and continuing to complete the electric energy conversion from the high-voltage DC bus to the positive side and neutral point of the low-voltage DC bus.

The embodiments of the present application also provide a control device for the bipolar bidirectional DC converter, which comprises a normal working unit, and the normal working unit controls the isolating switches connected to the positive electrodes and the negative electrodes of the high-voltage DC ports and the low-voltage DC ports of all the valve group series to close when the bipolar bidirectional DC converter works normally.

According to some embodiments, the control device further comprises a first detecting unit, a first adjusting unit, a second detecting unit and a second adjusting unit, wherein the first detecting unit detects a first potential difference between the positive electrode of the low-voltage DC port and the negative electrode of the low-voltage DC port of the Type-I valve group series, and enables the first adjusting unit when the first potential difference deviates from a first target value; the first adjusting unit adjusts the power transmitted through the magnetic elements by the voltage source converters of the Type-I valve group series till the first potential difference is equal to the first target value, wherein the voltage source converters are located between the positive electrode of the low-voltage DC port and the negative electrode of the low-voltage DC port of the Type-I valve group series or between the positive electrode of the low-voltage DC port and the positive electrode of the high-voltage DC port of the Type-I valve group series; the second detecting unit detects a second potential difference between the negative electrode of the low-voltage DC port and the negative electrode of the high-voltage DC port of the Type-I valve group series, and enables the second adjusting unit when the second potential difference deviates from a second target value; and the second adjusting unit adjusts the power transmitted through the magnetic elements by the voltage source converters of the Type-I valve group series till the second potential difference is equal to the second target value, wherein the voltage source converters are located between the positive electrode of the low-voltage DC port and the negative electrode of the low-voltage DC port of the Type-I valve group series or between the negative electrode of the low-voltage DC port and the negative electrode of the high-voltage DC port of the Type-I valve group series.

According to some embodiments, the control device further comprises a third detecting unit, a third adjusting unit, a fourth detecting unit and a fourth adjusting unit, wherein the third detecting unit detects a third potential difference between the positive electrode of the low-voltage DC port and the negative electrode of the low-voltage DC port of the Type-II valve group series, and enables the third adjusting unit when the third potential difference deviates from a third target value; the third adjusting unit adjusts the power transmitted through the AC transformers by the voltage source converters of the Type-II valve group series till the third potential difference is equal to the third target value, wherein the voltage source converters are located between the positive electrode of the low-voltage DC port and the negative electrode of the low-voltage DC port of the Type-II valve group series or between the negative electrode of the low-voltage DC port and the negative electrode of the high-voltage DC port of the Type-II valve group series; the fourth detecting unit detects a fourth potential difference between the negative electrode of the low-voltage DC port and the negative electrode of the high-voltage DC port of the Type-II valve group series, and enables the fourth adjusting unit when the fourth potential difference deviates from a fourth target value; and the fourth adjusting unit adjusts the power transmitted through the AC transformers by the voltage source converters of the Type-II valve group series till the fourth potential difference is equal to the fourth target value, wherein the voltage source converters are located between the positive electrode of the low-voltage DC port and the negative electrode of the low-voltage DC port of the Type-II valve group series or between the positive electrode of the low-voltage DC port and the positive electrode of the high-voltage DC port of the Type-II valve group series.

According to some embodiments, the control device further comprises a high-voltage DC bus short-term failure handling unit, a low-voltage side DC bus positive side short-term failure handling unit and a low-voltage side DC bus negative side short-term failure handling unit, wherein the high-voltage DC bus short-term failure handling unit adjusts the switching state of the power modules composed of the full-bridge plus capacitor structures in all the valve group series when the high-voltage DC bus has a short-term failure, and restores the switching state of the modules after the failure is repaired; the low-voltage side DC bus positive side short-term failure handling unit adjusts the switching state of the power modules composed of the full-bridge plus capacitor structures of the voltage source converters between the low-voltage DC ports in all the Type-I valve group series when a positive side of the low-voltage side DC bus has a short-term failure to ground or the neutral point, and restores the switching state of the modules after the failure is repaired; and the low-voltage side DC bus negative side short-term failure handling unit adjusts the switching state of the power modules composed of the full-bridge plus capacitor structures of the voltage source converters between the low-voltage DC ports in all the Type-II valve group series when a negative side of the low-voltage side DC bus has a short-term failure to ground or the neutral point, and restores the switching state of the modules after the failure is repaired.

According to some embodiments, the control device further comprises a low-voltage side DC bus positive side permanent failure handling unit and a low-voltage side DC bus negative side permanent failure handling unit, wherein the low-voltage side DC bus positive side permanent failure handling unit locks the Type-I valve group series, and opens the isolating switches or full-control switches connected to the positive electrodes and the negative electrodes of the high-voltage DC port and the low-voltage DC port of the Type-I valve group series to isolate the failure when the positive side of the low-voltage side DC bus has a permanent failure to ground or the neutral point, keeps the working state of the Type-II valve group series unchanged, and continues to complete the electric energy conversion from the high-voltage DC bus to the negative side and neutral point of the low-voltage DC bus; and the low-voltage side DC bus negative side permanent failure handling unit locks the Type-II valve group series, and opens the isolating switches or full-control switches connected to the positive electrodes and the negative electrodes of the high-voltage DC port and the low-voltage DC port of the Type-II valve group series to isolate the failure when the negative side of the low-voltage side DC bus has a permanent failure to ground or the neutral point, keeps the working state of the Type-I valve group series unchanged, and continues to complete the electric energy conversion from the high-voltage DC bus to the positive side and neutral point of the low-voltage DC bus.

Compared with a circuit adopting an MMC back-to-back structure in the prior art, the technical scheme provided by the embodiments of the present application constructs a structure featuring pseudo-bipolar connection at a high-voltage side and true-bipolar connection at a low-voltage side in the same manner. According to the scheme proposed by this application, the capacity of a valve group and transformer of the system can be reduced, and the design cost of the system can be reduced. Compared with the AUTO-DC scheme proposed in the existing documents, according to the scheme proposed in this application, the high-voltage DC bus can adopt the pseudo-bipolar connection mode, and the problem of insulation stress increase due to the fact that the positive and negative side voltage to ground on the low-voltage side and the voltage to ground on the high-voltage side are the same does not exist. Compared with the optimized AUTO-DC scheme proposed in the existing documents, according to the scheme proposed in this application, when one electrode of the low-voltage side DC bus fails, the normal operation of the other electrode will not be affected, and the electric energy conversion from the high-voltage DC bus to the low-voltage DC bus can still be realized, thus satisfying the true-bipolar connection of the low-voltage side DC bus.

BRIEF DESCRIPTION OF THE DRAWINGS

In order to explain the technical scheme in the embodiments of the present application more clearly, the drawings used in the description of the embodiments will be briefly introduced below. Obviously, the drawings in the following description are only for illustrating some embodiments of the present application, and for those of ordinary skill in the field, other drawings can be obtained according to these drawings without paying creative labor.

DETAILED DESCRIPTION OF PREFERRED EMBODIMENTS

In order to make the purpose, technical scheme and advantages of the embodiments of the present application clearer, the specific implementations of the technical scheme of the present application will be described in more detail and clearly with reference to the drawings and embodiments. However, the specific implementations and embodiments described below are for the purpose of illustration only, and are not a limitation of the present application. They only cover some embodiments of the present application, but not all embodiments. Other embodiments obtained by those skilled in the art for various changes of the present application belong to the scope of protection of the present application.

It should be understood that the terms "first", "second", "third" and "fourth" in the claims, specification and drawings of the present application are used to distinguish different objects, but not to describe a specific order. As used in the specification and claims of the present application, the terms "comprise" and "include" indicate the presence of the described features, integers, steps, operations, elements and/or components, but do not exclude the presence or addition of one or more other features, integers, steps, operations, elements, components and/or groups thereof.

The present application provides a bipolar bidirectional DC converter to solve the problem of connecting an AUTO-DC converter to a system with a pseudo-bipolar connection type high-voltage side DC bus and a true-bipolar connection type low-voltage side DC bus. When one electrode of a low-voltage side DC bus fails, the normal operation of the other electrode will not be affected, and the electric energy conversion from a high-voltage DC bus to a low-voltage DC bus can still be realized. The application also provides a control method and a control device for the bipolar bidirectional DC converter.

Figure 1:
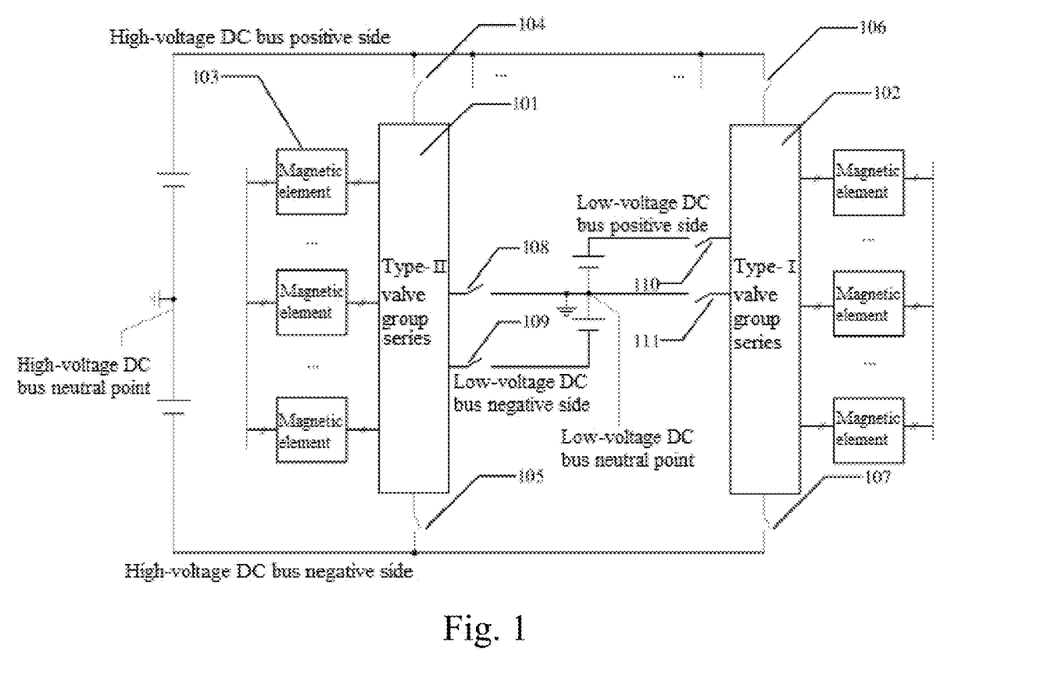
FIG. 1 is a structural diagram of a bipolar bidirectional DC converter proposed in the present application.

FIG. 1 is a structural diagram of a bipolar bidirectional DC converter proposed in the present application.

Referring to FIG. 1, the bidirectional DC converter is composed of at least two valve group series and six magnetic elements.

Each valve group series comprises a high-voltage DC port, a low-voltage DC port and at least three AC ports, positive electrodes of the high-voltage DC ports of all the valve group series are connected to serve as a positive electrode of a high-voltage side port of the bidirectional DC converter, and negative electrodes of the high-voltage DC ports of all the valve group series are connected to serve as a negative electrode of the high-voltage side port of the bidirectional DC converter.

For all the valve group series, each AC port is connected to a magnetic element. All the other ends of the magnetic elements which are connected to the AC ports of a single valve group series are in parallel.

The valve group series are divided into a Type-I valve group series and a Type-II valve group series according to the connection relationship between the valve group series and the low-voltage side port of the bidirectional DC converter. A positive electrode of a low-voltage DC port of the Type-I valve group series forms a positive electrode of the low-voltage side port of the bidirectional DC converter, and a negative side of the low-voltage DC port of the Type-I valve group series forms a neutral point of the low-voltage side port of the bidirectional DC converter. A positive electrode of a low-voltage DC port of the Type-II valve group series forms a neutral point of the low-voltage side port of the bidirectional DC converter, and a negative side of the low-voltage DC port of the Type-II valve group series forms a negative electrode of the low-voltage side port of the bidirectional DC converter. The neutral points of the low-voltage side port of the bidirectional DC converter formed by the Type-I valve group series and the Type-II valve group series are the same point.

As shown in FIG. 1, component 101 is the Type-I valve group series, component 102 is the Type-II valve group series, and component 103 is the magnetic element.

As shown in FIG. 1, components 104 to 111 are isolating switches, wherein components 104-107 are isolating switches connected to the high-voltage side ports of the valve group series, and components 108-111 are isolating switches connected to the low-voltage side ports of the valve group series. The isolating switches may be, but not limited to, full-control switches.

The first isolating switches 106, 104 are respectively connected between the positive electrodes of the high-voltage DC ports of the Type-I valve group series and the Type-II valve group series and a positive side of a high-voltage DC bus. The second isolating switches 107, 105 are respectively connected between the negative electrodes of the high-voltage DC ports of the Type-I valve group series and the Type-II valve group series and a negative side of a high-voltage DC bus. The third isolating switch 110 is connected between the positive electrode of the low-voltage DC port of the Type-I valve group series and a positive side of a low-voltage DC bus. The fourth isolating switch 111 is connected between a negative electrode of the low-voltage DC port of the Type-I valve group series and a neutral point of the low-voltage DC bus. The fifth isolating switch 108 is connected between the positive electrode of the low-voltage DC port of the Type-II valve group series and the neutral point of the low-voltage DC bus. The sixth isolating switch 109 is connected between the negative electrode of the low-voltage DC port of the Type-II valve group series and a negative electrode of the low-voltage DC bus.

Figure 2:
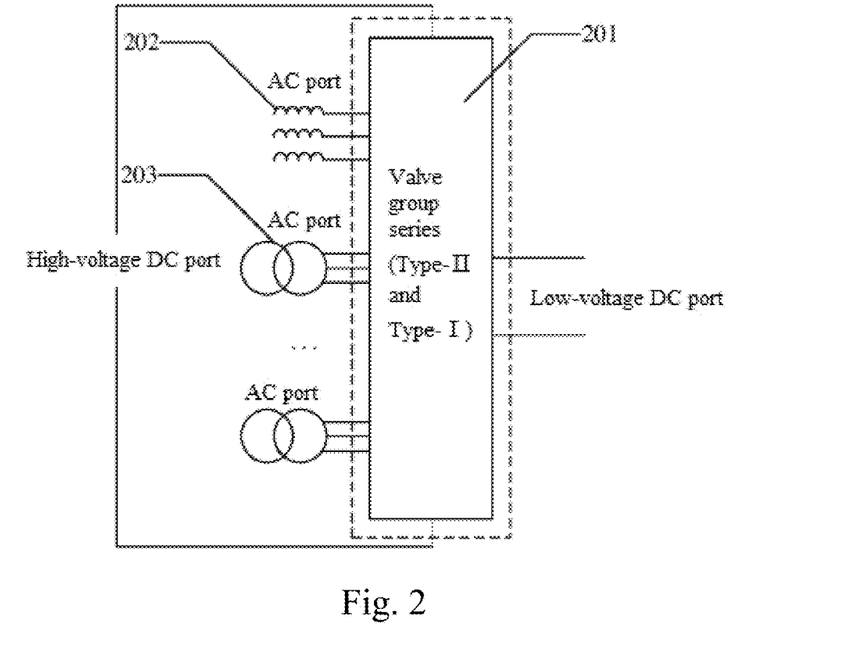
FIG. 2 is a diagram of the definition of each port of a single valve group series.

FIG. 2 is a diagram of the definition of each port of a single valve group series.

Referring to FIG. 2, component 201 illustrates the composition of a valve group series, comprising a high-voltage DC port, a low-voltage DC port and at least three AC ports.

The positive electrodes of the high-voltage DC ports of all the valve group series of the bidirectional DC converter are respectively connected to the positive side of the high-voltage DC bus after passing through the isolating switches. The negative electrodes of the high-voltage DC ports of all the valve group series are connected to the negative side of the high-voltage DC buses after passing through the isolating switches. The positive electrode and negative electrode of the low-voltage DC port of the Type-I valve group series of the bidirectional DC converter are respectively connected to the positive side and neutral point of the low-voltage DC bus after passing through the isolating switches. The positive electrode and negative electrode of the low-voltage DC port of the Type-II valve group series of the bidirectional DC converter are respectively connected to the neutral point and the negative side of the low-voltage DC bus after passing through the isolating switches.

As shown in FIG. 2, component 202 is a reactor, the magnetic element connected to a single valve group series can be a reactor, and each outlet terminal of the AC port is connected to a reactor. Component 203 is an AC transformer, the magnetic element connected to a single valve group series can be an AC transformer, and one AC port is connected to one AC transformer.

The Type-I valve group series and the Type-II valve group series of the bidirectional DC converter each comprise voltage source converters, the number of which is the same as that of the AC ports, all the voltage source converters adopt AC-DC conversion circuits, and the AC-DC conversion circuit at least comprises an AC port and a DC port.

The DC ports of all the voltage source converters in the Type-I valve group series and the Type-II valve group series of the bidirectional DC converter are connected in series end to end, a positive electrode of the DC port of the first voltage source converter and a negative electrode of the DC port of the last voltage source converter form a high-voltage DC port of a valve group series, each voltage source converter contains at least one AC port, and all the AC ports are the AC ports of the valve group series.

Figure 3:
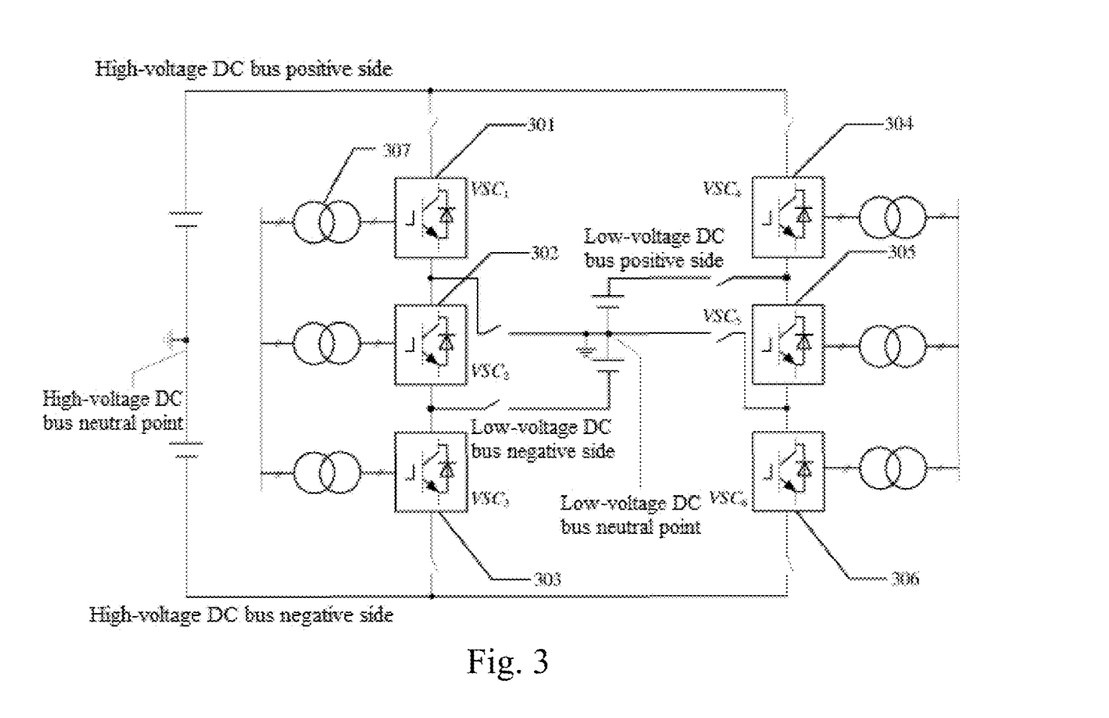
FIG. 3 is a structural diagram of a bidirectional DC converter comprising only two valve group series and each valve group series comprising only three VSCs.

To simplify the description, the voltage source converter is also called VSC. As shown in FIG. 3, a bidirectional DC converter with only two valve group series and only three voltage source converters in each valve group series is illustrated. In FIG. 3, components 301-306 represent the voltage source converters of the two valve group series, namely VSC1-VSC6, wherein VSC1, VSC2 and VSC3 are connected in series to form the Type-II valve group series, and VSC4, VSC5 and VSC6 are connected in series to form the Type-I valve group series. Component 307 represents the AC transformer.

Among all the voltage source converters of the valve group series, positive electrodes of the DC ports of two voltage source converters are led out to serve as the low-voltage DC port of the valve group series, wherein the positive electrode with higher voltage is taken as a positive side of the low-voltage DC port, and the positive electrode with lower voltage is taken as a negative side of the low-voltage DC port; for the Type-I valve group series, the selected negative side has the same potential as a neutral point of a high-voltage side DC bus; and for the Type-II valve group series, the selected positive side has the same potential as the neutral point of the high-voltage side DC bus, as shown in FIG. 3.

Among all the voltage source converters of the valve group series, negative electrodes of the DC ports of two voltage source converters of the valve group series are led out to serve as the low-voltage DC port of the valve group series, wherein the negative electrode with higher voltage is taken as the positive side of the low-voltage DC port, and the negative electrode with lower voltage is taken as the negative side of the low-voltage DC port; for the Type-I valve group series, the selected negative side has the same potential as the neutral point of the high-voltage side DC bus; and for the Type-II valve group series, the selected positive side has the same potential as the neutral point of the high-voltage side DC bus, as shown in FIG. 3.

The voltage source converter of the valve group series comprises at least four valve arms divided into two groups, with every two valve arms being connected in series; wherein each valve arm comprises a valve arm reactor and a power module which are connected in series, two ends of each group of valve arms connected in series in the vertical direction are connected in parallel to serve as the DC port of the voltage source converter, and midpoints of each group of valve arms connected in series in the vertical direction are led out to serve as the AC port.

Figure 4:
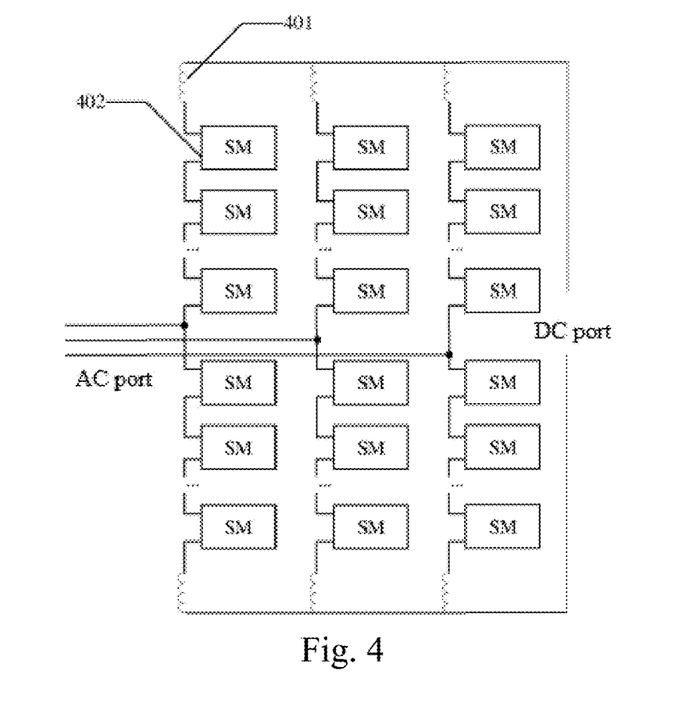
FIG. 4 is a structural diagram of a single voltage source converter.

FIG. 4 shows in detail a structural diagram of a voltage source converter in a valve group series.

As shown in FIG. 4, component 401 represents the valve arm reactor, and 402 represents the power module. One valve arm reactor is connected in series with several power modules SM to form a valve arm. In FIG. 4, six valve arms are adopted to form one voltage source converter, that is, MMC structure, and connection points of each group of upper and lower valve arms are led out, which can output three-phase alternating current; and if any pair of valve arms is removed, the voltage source converter can output single-phase alternating current.

Figure 5:
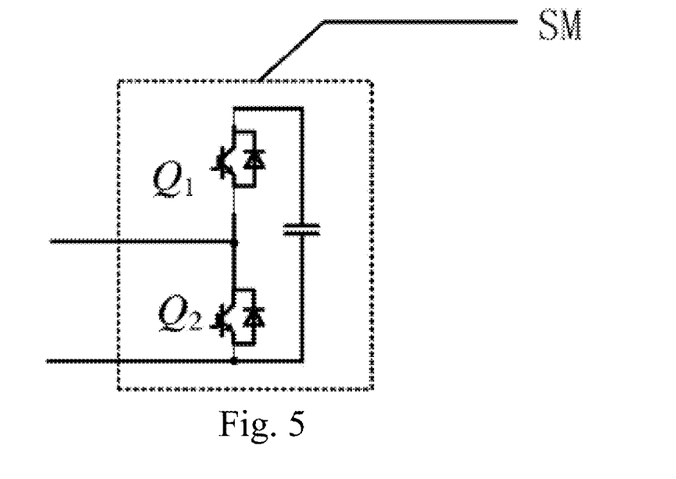
FIG. 5 is a half-bridge plus capacitor power module.

The valve arm of the voltage source converter of the valve group series is composed of the valve arm reactor and the power modules which are connected in series. All the power modules are composed of half-bridge plus capacitor structures. FIG. 5 is a power module with a half-bridge plus capacitor structure. As shown in FIGS. 5, Q1 and Q2 represent two full-control switch tubes of a half-bridge circuit.

Figure 6:
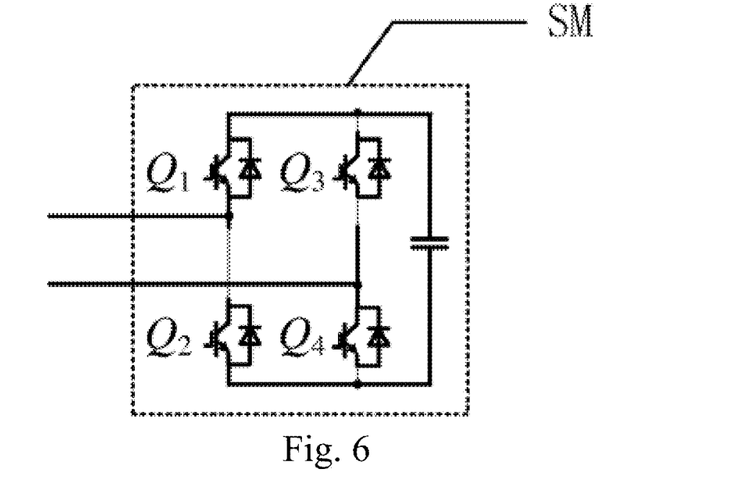
FIG. 6 is a full-bridge plus capacitor power module.

Optionally, all the power modules are composed of full-bridge plus capacitor structures. FIG. 6 is a power module with a full-bridge plus capacitor structure. As shown in FIGS. 6, Q1, Q2, Q3 and Q4 represent four full-control switch tubes of a full-bridge circuit.

Optionally, all the power modules are composed of a combination of full-bridge plus capacitor structures and half-bridge plus capacitor structures.

Figure 7:
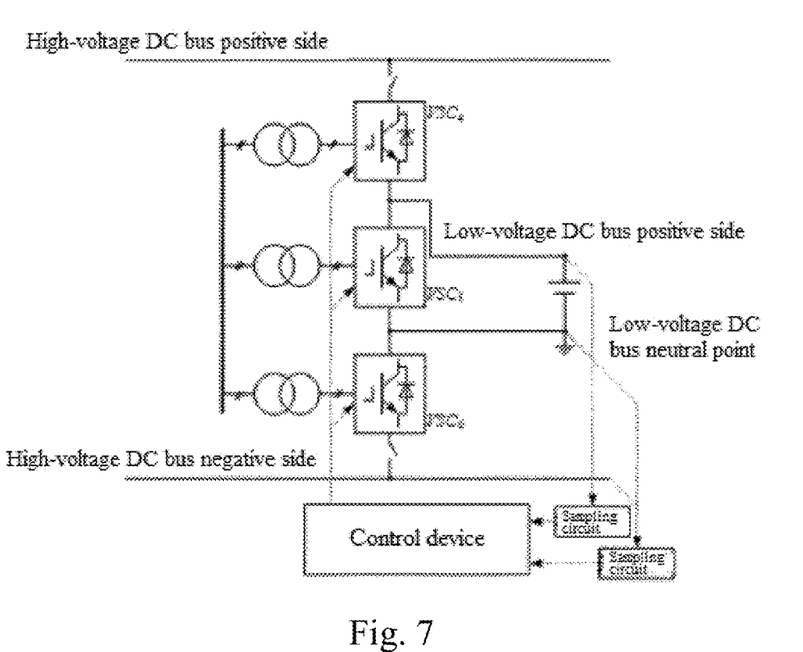
FIG. 7 is a diagram of a control strategy of a Type-I valve group series.
Figure 8:
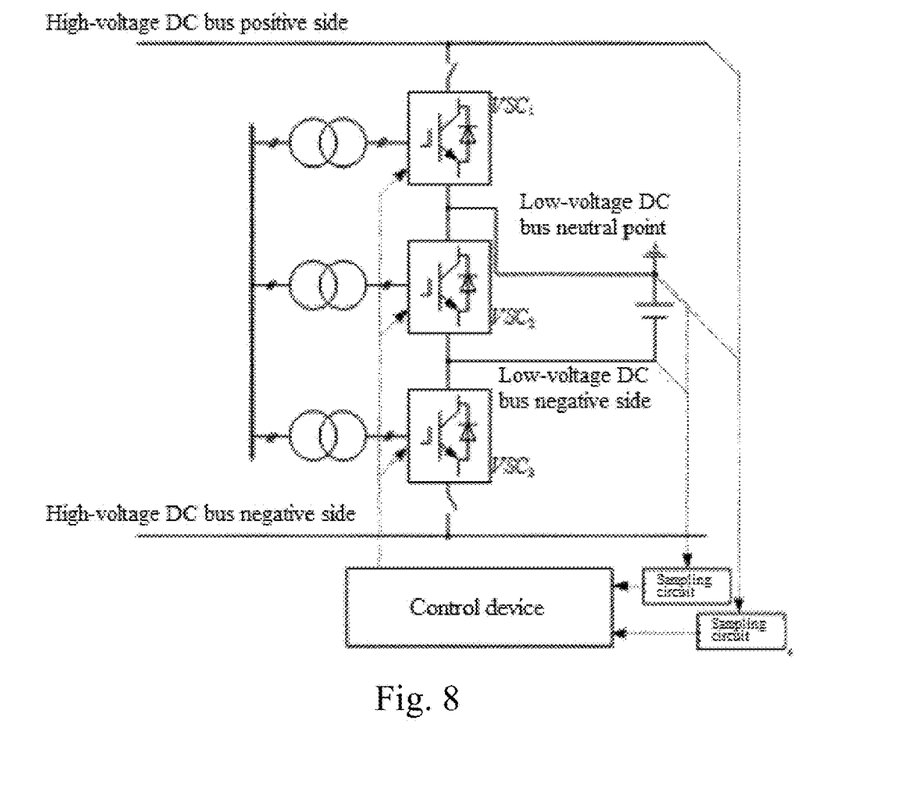
FIG. 8 is a diagram of a control strategy of a Type-II valve group series.

FIG. 7 is a diagram of a control strategy of a Type-I valve group series, and FIG. 8 is a diagram of a control strategy of a Type-II valve group series. With reference to FIGS. 7 and 8, a control method for a bipolar bidirectional DC converter is explained.

As shown in FIGS. 7 and 8, during normal operation, the isolating switches connected to the positive and negative electrodes of the high-voltage DC ports and low-voltage DC ports of all the valve group series are closed. As shown in FIG. 6, during normal operation, by turning on Q1 and Q4 and turning off Q2 and Q3, the full-bridge power module is enabled, and by turning on Q1 and Q3 and turning off Q2 and Q4, or turning on Q2 and Q4 and turning off Q1 and Q3, the full-bridge power module is disabled.

As shown in FIG. 7, the following control method is adopted for a single Type-I valve group series:

detecting a potential difference between the positive electrode of the low-voltage DC port and the negative electrode of the low-voltage DC port of the Type-I valve group series in real time; comparing the potential difference with a first target value which is half of a reference value of a positive and negative side voltage of a low-voltage DC port of the bidirectional DC converter; when the detection value deviates from the first target value, adjusting the power transmitted through the magnetic elements by the voltage source converter between the positive electrode of the low-voltage DC port and the negative electrode of the low-voltage DC port of the Type-I valve group series and the voltage source converter between the positive electrode of the low-voltage DC port and the positive electrode of the high-voltage DC port of the Type-I valve group series till the detection value is equal to the first target value;

detecting a potential difference between the negative electrode of the low-voltage DC port and the negative electrode of the high-voltage DC port of the Type-I valve group series in real time; comparing the potential difference with a second target value which is half of a reference value of a positive and negative side voltage of a high-voltage DC port of the bidirectional DC converter; when the detection value deviates from the second target value, adjusting the power transmitted through the magnetic elements by the voltage source converter between the positive electrode of the low-voltage DC port and the negative electrode of the low-voltage DC port of the Type-I valve group series and the voltage source converter between the negative electrode of the low-voltage DC port and the negative electrode of the high-voltage DC port of the Type-I valve group series till the detection value is equal to the second target value.

As shown in FIG. 8, the following control method is adopted for a single Type-II valve group series:

detecting a potential difference between the positive electrode of the low-voltage DC port and the negative electrode of the low-voltage DC port of the Type-II valve group series in real time; comparing the potential difference with a third target value which is half of a reference value of a positive and negative side voltage of a low-voltage DC port of the bidirectional DC converter; when the detection value deviates from the third target value, adjusting the power transmitted through the magnetic elements by the voltage source converter between the positive electrode of the low-voltage DC port and the negative electrode of the low-voltage DC port of the Type-II valve group series and the voltage source converter between the negative electrode of the low-voltage DC port and the negative electrode of the high-voltage DC port of the Type-II valve group series till the detection value is equal to the third target value;

detecting a potential difference between the negative electrode of the low-voltage DC port and the negative electrode of the high-voltage DC port of the Type-II valve group series in real time; comparing the potential difference with a fourth target value which is half of a reference value of a positive and negative side voltage of a high-voltage DC port of the bidirectional DC converter; when the detection value deviates from the fourth target value, adjusting the power transmitted through the magnetic elements by the voltage source converter between the positive electrode of the low-voltage DC port and the negative electrode of the low-voltage DC port of the Type-II valve group series and the voltage source converter between the positive electrode of the low-voltage DC port and the positive electrode of the high-voltage DC port of the Type-II valve group series till the detection value is equal to the fourth target value.

As shown in FIGS. 7 and 8, when the high-voltage DC bus has a short-term failure, adjusting the switching state of the power modules composed of the full-bridge plus capacitor structures in all the valve group series; and after the failure is repaired, restoring the switching state of the modules.

When a positive side of the low-voltage side DC bus has a short-term failure to ground or the neutral point, adjusting the switching state of the power modules composed of the full-bridge plus capacitor structures of the voltage source converters between the low-voltage DC ports in all the Type-I valve group series; and after the failure is repaired, restoring the switching state of the modules.

When a negative side of the low-voltage side DC bus has a short-term failure to ground or the neutral point, adjusting the switching state of the power modules composed of the full-bridge plus capacitor structures of the voltage source converters between the low-voltage DC ports in all the Type-II valve group series; and after the failure is repaired, restoring the switching state of the modules.

When a short-term failure occurs, controlling the full-bridge output current by frequently switching between turning on Q1 and Q4 and turning off Q2 and Q3, and turning on Q2 and Q3 and turning off Q1 and Q4, that is, controlling the magnitude of failure current; and after the failure is repaired, returning to the aforementioned normal working state.

As shown in FIGS. 7 and 8, when the positive side of the low-voltage side DC bus has a permanent failure to ground or the neutral point, locking the Type-I valve group series, and opening the isolating switches connected to the positive electrodes and the negative electrodes of the high-voltage DC port and the low-voltage DC port of the Type-I valve group series to isolate the failure; and keeping the working state of the Type-II valve group series unchanged, and continuing to complete the electric energy conversion from the high-voltage DC bus to the negative side and neutral point of the low-voltage DC bus.

When the negative side of the low-voltage side DC bus has a permanent failure to ground or the neutral point, locking the Type-II valve group series, and opening the isolating switches connected to the positive electrodes and the negative electrodes of the high-voltage DC port and the low-voltage DC port of the Type-II valve group series to isolate the failure; and keeping the working state of the Type-I valve group series unchanged, and continuing to complete the electric energy conversion from the high-voltage DC bus to the positive side and neutral point of the low-voltage DC bus.

By opening the switches represented by components 104, 105, 108 and 109, the Type-I valve group series can be isolated, and by opening the switches represented by components 106, 107, 110 and 111, the Type-II valve group series can be isolated, as shown in FIG. 1.

Figure 9:
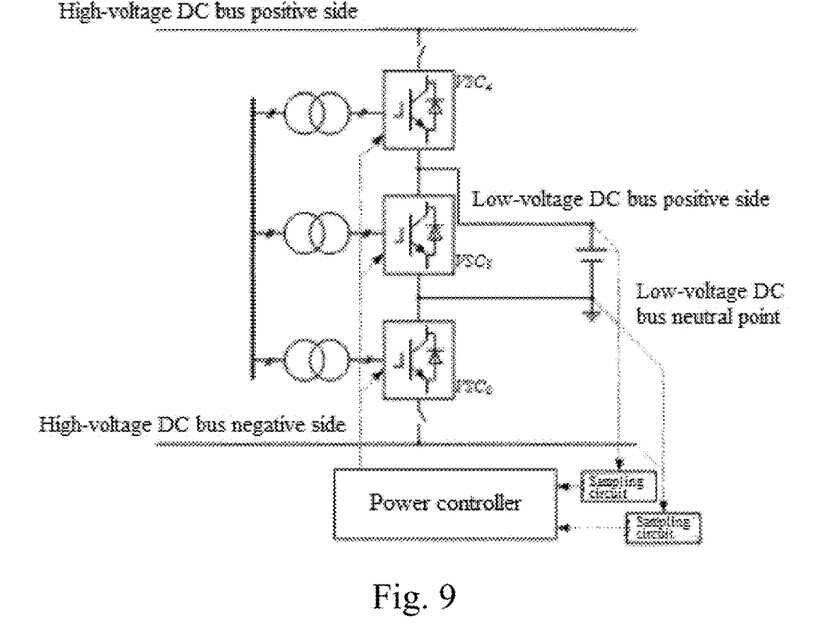
FIG. 9 is a diagram of a control strategy of a Type-I valve group series provided by another embodiment.
Figure 10:
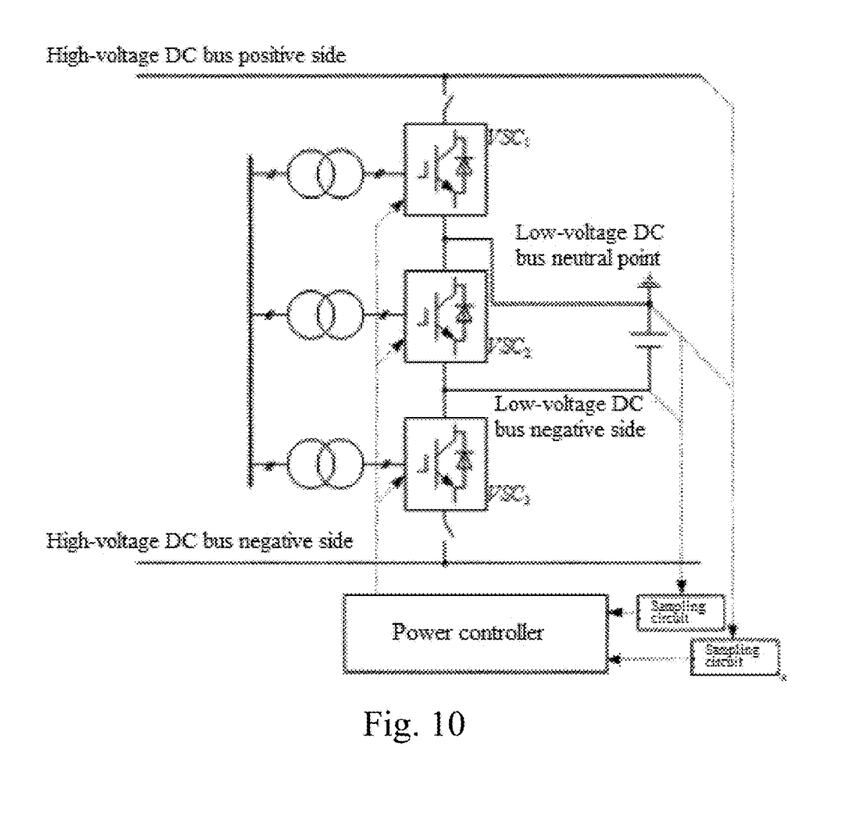
FIG. 10 is a diagram of a control strategy of a Type-II valve group series provided by another embodiment.

The embodiments of the present application also provide a control device for the bipolar bidirectional DC converter. FIG. 7 is a diagram of a control strategy of a Type-I valve group series, and FIG. 8 is a diagram of a control strategy of a Type-II valve group series. The control device is also called a power divider. FIG. 9 is a diagram of a control strategy of a Type-I valve group series provided by another embodiment, and FIG. 10 is a diagram of a control strategy of a Type-II valve group series provided by another embodiment.

The control device comprises a normal working unit, and the normal working unit controls the isolating switches or full-control switches connected to the positive electrodes and the negative electrodes of the high-voltage DC ports and the low-voltage DC ports of all the valve group series to close when the bipolar bidirectional DC converter works normally.

Optionally, the control device for the bipolar bidirectional DC converter further comprises a first detecting unit, a first adjusting unit, a second detecting unit and a second adjusting unit.

The first detecting unit detects a first potential difference between the positive electrode of the low-voltage DC port and the negative electrode of the low-voltage DC port of the Type-I valve group series in real time; compares the first potential difference with a first target value which is half of a reference value of a positive and negative side voltage of a low-voltage DC port of the bidirectional DC converter; and enables the first adjusting unit when the first potential difference deviates from the first target value. The first adjusting unit adjusts the power transmitted through the magnetic elements by the voltage source converter between the positive electrode of the low-voltage DC port and the negative electrode of the low-voltage DC port of the Type-I valve group series and the voltage source converter between the positive electrode of the low-voltage DC port and the positive electrode of the high-voltage DC port of the Type-I valve group series till the first potential difference is equal to the first target value.

The second detecting unit detects a second potential difference between the negative electrode of the low-voltage DC port and the negative electrode of the high-voltage DC port of the Type-I valve group series in real time; compares the second potential difference with a second target value which is half of a reference value of a positive and negative side voltage of a high-voltage DC port of the bidirectional DC converter; and enables the second adjusting unit when the second potential difference deviates from the second target value. The second adjusting unit adjusts the power transmitted through the magnetic elements by the voltage source converter between the positive electrode of the low-voltage DC port and the negative electrode of the low-voltage DC port of the Type-I valve group series and the voltage source converter between the negative electrode of the low-voltage DC port and the negative electrode of the high-voltage DC port of the Type-I valve group series till the second potential difference is equal to the second target value.

Optionally, the control device for the bipolar bidirectional DC converter further comprises a third detecting unit, a third adjusting unit, a fourth detecting unit and a fourth adjusting unit.

The third detecting unit detects a third potential difference between the positive electrode of the low-voltage DC port and the negative electrode of the low-voltage DC port of the Type-II valve group series in real time; compares the third potential difference with a third target value which is half of a reference value of a positive and negative side voltage of a low-voltage DC port of the bidirectional DC converter; and enables the third adjusting unit when the third potential difference deviates from the third target value. The third adjusting unit adjusts the power transmitted through the magnetic elements by the voltage source converter between the positive electrode of the low-voltage DC port and the negative electrode of the low-voltage DC port of the Type-II valve group series and the voltage source converter between the negative electrode of the low-voltage DC port and the negative electrode of the high-voltage DC port of the Type-II valve group series till the third potential difference is equal to the third target value.

The fourth detecting unit detects a fourth potential difference between the negative electrode of the low-voltage DC port and the negative electrode of the high-voltage DC port of the Type-II valve group series in real time; compares the fourth potential difference with a fourth target value which is half of a reference value of a positive and negative side voltage of a high-voltage DC port of the bidirectional DC converter; and enables the fourth adjusting unit when the fourth potential difference deviates from the fourth target value. The fourth adjusting unit adjusts the power transmitted through the magnetic elements by the voltage source converter between the positive electrode of the low-voltage DC port and the negative electrode of the low-voltage DC port of the Type-II valve group series and the voltage source converter between the positive electrode of the low-voltage DC port and the positive electrode of the high-voltage DC port of the Type-II valve group series till the fourth potential difference is equal to the fourth target value.

Optionally, the control device further comprises a high-voltage DC bus short-term failure handling unit, a low-voltage side DC bus positive side short-term failure handling unit and a low-voltage side DC bus negative side short-term failure handling unit.

The high-voltage DC bus short-term failure handling unit adjusts the switching state of the power modules composed of the full-bridge plus capacitor structures in all the valve group series when the high-voltage DC bus has a short-term failure, and restores the switching state of the modules after the failure is repaired; the low-voltage side DC bus positive side short-term failure handling unit adjusts the switching state of the power modules composed of the full-bridge plus capacitor structures of the voltage source converters between the low-voltage DC ports in all the Type-I valve group series when a positive side of the low-voltage side DC bus has a short-term failure to ground or the neutral point, and restores the switching state of the modules after the failure is repaired; and the low-voltage side DC bus negative side short-term failure handling unit adjusts the switching state of the power modules composed of the full-bridge plus capacitor structures of the voltage source converters between the low-voltage DC ports in all the Type-II valve group series when a negative side of the low-voltage side DC bus has a short-term failure to ground or the neutral point, and restores the switching state of the modules after the failure is repaired.

Optionally, the control device further comprises a low-voltage side DC bus positive side permanent failure handling unit and a low-voltage side DC bus negative side permanent failure handling unit.

The low-voltage side DC bus positive side permanent failure handling unit locks the Type-I valve group series, and opens the isolating switches or full-control switches connected to the positive electrodes and the negative electrodes of the high-voltage DC port and the low-voltage DC port of the Type-I valve group series to isolate the failure when the positive side of the low-voltage side DC bus has a permanent failure to ground or the neutral point, keeps the working state of the Type-II valve group series unchanged, and continues to complete the electric energy conversion from the high-voltage DC bus to the negative side and neutral point of the low-voltage DC bus.

The low-voltage side DC bus negative side permanent failure handling unit locks the Type-II valve group series, and opens the isolating switches or full-control switches connected to the positive electrodes and the negative electrodes of the high-voltage DC port and the low-voltage DC port of the Type-II valve group series to isolate the failure when the negative side of the low-voltage side DC bus has a permanent failure to ground or the neutral point, keeps the working state of the Type-I valve group series unchanged, and continues to complete the electric energy conversion from the high-voltage DC bus to the positive side and neutral point of the low-voltage DC bus.

In order to quantitatively explain the adjustment principle of this application, taking the circuit shown in FIG. 3 as an example, a method for determining quantitative parameters is introduced. Assuming that the voltage level of the high-voltage side is $\pm E1$ pseudo-bipolar, that is, the positive and negative side voltage of the high-voltage side port is $2E1$; the voltage level of the low-voltage side is $\pm E2$ true-bipolar, that is, the positive and negative side voltage of the low-voltage side port is $2E2$, $E1>E2$, and if $n=E1/E2$, then $n>1$. Assuming that the rated power of the bidirectional DC converter is P, that is, the input and output power of the high-voltage side port is P, and the output power of each electrode of the low-voltage side is $P/2$.

According to voltage level classification, it is necessary to make the DC ports of VSC1 and VSC6 have the same rated voltage, which is E1, and the DC ports of VSC2 and VSC5 have the same rated voltage, which is E2, so the rated voltage of VSC3 and VSC4 is E2-E1.

According to Kirchhoff's law, VSC1, VSC2 and VSC3 are connected in series, and VSC4, VSC5 and VSC6 are connected in series, so the currents at DC ports are equal, and the rated power of VSC1 and VSC6 is $P/4$. Based on $n=E1/E2$, it can be deduced that the rated design power of VSC3 and VSC4 is $(n-1)/n*(P/4)$, and the AC port power of VSC1 and VSC6 and the AC port power of VSC3 and VSC4 will be transferred to VSC2 and VSC5 respectively through the magnetic elements, so the rated power of VSC2 and VSC5 is $((2n-1)/n*(P/4))$.

As the rated power and DC port voltage of each VSC are known, the VSC body can be designed with reference to the existing design method of voltage source converters based on MMC structures.

The rated active power of the AC transformer connected to each VSC is the same as the rated power of the corresponding VSC, and the transformer voltage can be determined according to the transformation modulation ratio from AC to DC of VSC.

Thus, according to this application, a bidirectional DC converter with pseudo-bipolar connection on the high-voltage side and true-bipolar connection on the low-voltage side can be designed.

Compared with a circuit adopting an MMC back-to-back structure in the prior art, the technical scheme provided by the embodiments of the present application constructs a structure featuring pseudo-bipolar connection at a high-voltage side and true-bipolar connection at a low-voltage side in the same manner. According to the scheme proposed by this application, the capacity of a valve group and transformer of the system can be reduced, and the design cost of the system can be reduced. Compared with the AUTO-DC scheme proposed in the existing documents, according to the scheme proposed in this application, the high-voltage DC bus can adopt the pseudo-bipolar connection mode, and the problem of insulation stress increase due to the fact that the positive and negative side voltage to ground on the low-voltage side and the voltage to ground on the high-voltage side are the same does not exist. Compared with the optimized AUTO-DC scheme proposed in the existing documents, according to the scheme proposed in this application, when one electrode of the low-voltage side DC bus fails, the normal operation of the other electrode will not be affected, and the electric energy conversion from the high-voltage DC bus to the low-voltage DC bus can still be realized, thus satisfying the true-bipolar connection of the low-voltage side DC bus.

It should be noted that the embodiments described above with reference to the drawings are only used to illustrate the present application, but not to limit the scope of the present application. Those of ordinary skill in the art should understand that modifications or equivalent substitutions made to the present application without departing from the spirit and scope of the present application should be covered within the scope of the present application. In addition, unless otherwise specified in the context, words appearing in the singular form include the plural form, and vice versa. In addition, all or part of any embodiment can be used in combination with all or part of any other embodiment unless otherwise specified.

What is claimed is:

1. A bipolar bidirectional DC converter, comprising:
   at least two valve group series being distinguished from each other according to connection relationship between the valve group series and a low-voltage side port of the bidirectional DC converter, and comprising:
   a Type-I valve group series, a positive electrode of a low-voltage DC port of the Type-I valve group series forming a positive electrode of the low-voltage side port of the bipolar bidirectional DC converter; and
   a Type-II valve group series, a positive electrode of a low-voltage DC port of the Type-II valve group series being connected to a negative electrode of the low-voltage DC port of the Type-I valve group series and forming a neutral point of the low-voltage side port of the bipolar bidirectional DC converter, and a negative electrode of the low-voltage DC port of the Type-II valve group series forming a negative electrode of the low-voltage side port of the bipolar bidirectional DC converter;
   wherein each of said valve group series comprises:
   a low-voltage DC port;
   a high-voltage DC port, positive electrodes of all the high-voltage DC ports being connected together to serve as a positive electrode of a high-voltage side port of the bipolar bidirectional DC converter, and negative electrodes of all the high-voltage DC ports being connected together to serve as a negative electrode of the high-voltage side port of the bipolar bidirectional DC converter; and
   at least three AC ports, each of said AC ports being connected to a magnetic element; and
   wherein the bipolar bidirectional DC converter further comprises at least six magnetic elements, one end of each said magnetic element is connected to a corresponding AC port, and the other ends of the magnetic elements connected to all the AC ports in a same valve group series are connected together.

2. The bipolar bidirectional DC converter according to claim 1, further comprising:
   first isolating switches connected between the positive electrodes of the high-voltage DC ports of the valve group series and a positive side of a high-voltage DC bus;
   second isolating switches connected between the negative electrodes of the high-voltage DC ports of the valve group series and a negative side of the high-voltage DC bus;
   a third isolating switch connected between the positive electrode of the low-voltage DC port of the Type-I valve group series and a positive side of a low-voltage DC bus;
   a fourth isolating switch connected between a negative electrode of the low-voltage DC port of the Type-I valve group series and a neutral point of the low-voltage DC bus;
   a fifth isolating switch connected between the positive electrode of the low-voltage DC port of the Type-II valve group series and the neutral point of the low-voltage DC bus; and
   a sixth isolating switch connected between the negative electrode of the low-voltage DC port of the Type-II valve group series and a negative electrode of the low-voltage DC bus.

3. The bipolar bidirectional DC converter according to claim 2, wherein each of said valve group series comprises:
   voltage source converters, a number of the voltage source converters being same as that of the AC ports of the valve group series, and each of said voltage source converters comprises:
   an AC-DC conversion circuit at least comprising one AC port and one DC port.

4. The bipolar bidirectional DC converter according to claim 3, wherein:
   the DC ports of all the voltage source converters in the valve group series are connected in series end to end, a positive electrode of the DC port of a first voltage source converter is defined as the positive electrode of the high-voltage DC port of the valve group series, and a negative electrode of the DC port of a last voltage source converter is defined as the negative electrode of the high-voltage DC port of the valve group series; and
   all the AC ports are defined as the AC ports of the valve group series.

5. The bipolar bidirectional DC converter according to claim wherein:
positive electrodes of the DC ports of two voltage source converters of the valve group series are selected to lead out to serve as the low-voltage DC port of the valve group series, a positive electrode with a higher voltage is taken as a positive side of the low-voltage DC port, and a positive electrode with a lower voltage is taken as a negative side of the low-voltage DC port; and
for the Type-I valve group series, the selected negative side has a same potential as a neutral point of a high-voltage side DC bus; and for the Type-II valve group series, the selected positive side has a same potential as the neutral point of the high-voltage side DC bus.

6. The bipolar bidirectional DC converter according to claim wherein:
negative electrodes of the DC ports of two voltage source converters of the valve group series are selected to lead out to serve as the low-voltage DC port of the valve group series, a negative electrode with a higher voltage is taken as a positive side of the low-voltage DC port, and a negative electrode with a lower voltage is taken as a negative side of the low-voltage DC port; and
for the Type-I valve group series, the selected negative side has a same potential as a neutral point of a high-voltage side DC bus; and for the Type-II valve group series, the selected positive side has a same potential as the neutral point of the high-voltage side DC bus.

7. The bipolar bidirectional DC converter according to claim wherein the said voltage source converter comprises:
at least four valve arms divided into two groups, with the two valve arms in each of said groups being connected in series, wherein each said valve arm comprises a valve arm reactor and a power module connected in series, two ends of each group of the valve arms connected in series in a vertical direction are connected in parallel to serve as the DC port of the voltage source converter, and midpoints of each group of the valve arms connected in series in the vertical direction are led out to serve as the AC port of the voltage source converter.

8. The bipolar bidirectional DC converter according to claim 7, wherein the power module comprises:
a half-bridge plus capacitor structure and/or a full-bridge plus capacitor structure.

9. A method for controlling the bipolar bidirectional DC converter according to claim 8, comprising:
during normal operation, closing the isolating switches connected to the positive electrodes and negative electrodes of the high-voltage DC ports and low-voltage DC ports of all the valve group series.

10. The method according to claim 9, further comprising:
detecting a first potential difference between the positive electrode of the low-voltage DC port and the negative electrode of the low-voltage DC port of the Type-I valve group series;
when the first potential difference deviates from a first target value, adjusting power transmitted through the magnetic elements by the voltage source converters of the Type-I valve group series till the first potential difference is equal to the first target value, wherein the voltage source converters are located between the positive electrode of the low-voltage DC port and the negative electrode of the low-voltage DC port of the Type-I valve group series or between the positive electrode of the low-voltage DC port and the positive electrode of the high-voltage DC port of the Type-I valve group series;
detecting a second potential difference between the negative electrode of the low-voltage DC port and the negative electrode of the high-voltage DC port of the Type-I valve group series; and
when the second potential difference deviates from a second target value, adjusting the power transmitted through the magnetic elements by the voltage source converters of the Type-I valve group series till the second potential difference is equal to the second target value, wherein the voltage source converters are located between the positive electrode of the low-voltage DC port and the negative electrode of the low-voltage DC port of the Type-I valve group series or between the negative electrode of the low-voltage DC port and the negative electrode of the high-voltage DC port of the Type-I valve group series.

11. The method according to claim 10, wherein
the first target value is a half of a reference value of a positive and negative side voltage of the low-voltage DC port of the bipolar bidirectional DC converter, and
the second target value is a half of a reference value of a positive and negative side voltage of the high-voltage DC port of the bipolar bidirectional DC converter.

12. The method according to claim 9, further comprising:
detecting a third potential difference between the positive electrode of the low-voltage DC port and the negative electrode of the low-voltage DC port of the Type-II valve group series;
when the third potential difference deviates from a third target value, adjusting the power transmitted through the magnetic elements by the voltage source converters of the Type-II valve group series till the third potential difference is equal to the third target value, wherein the voltage source converters are located between the positive electrode of the low-voltage DC port and the negative electrode of the low-voltage DC port of the Type-II valve group series or between the negative electrode of the low-voltage DC port and the negative electrode of the high-voltage DC port of the Type-II valve group series;
detecting a fourth potential difference between the negative electrode of the low-voltage DC port and the negative electrode of the high-voltage DC port of the Type-II valve group series; and
when the fourth potential difference deviates from a fourth target value, adjusting the power transmitted through the magnetic elements by the voltage source converters of the Type-II valve group series till the fourth potential difference is equal to the fourth target value, wherein the voltage source converters are located between the positive electrode of the low-voltage DC port and the negative electrode of the low-voltage DC port of the Type-II valve group series or between the positive electrode of the low-voltage DC port and the positive electrode of the high-voltage DC port of the Type-II valve group series.

13. The method according to claim 12, wherein:
the third target value is a half of a reference value of a positive and negative side voltage of a low-voltage DC port of the bipolar bidirectional DC converter, and
the fourth target value is a half of a reference value of a positive and negative side voltage of a high-voltage DC port of the bipolar bidirectional DC converter.

14. The method according to claim 9, further comprising:
when the high-voltage DC bus has a short-term failure,
adjusting a switching state of the power modules composed of the full-bridge plus capacitor structures in all the valve group series; and
after the failure is repaired, restoring the switching state of the modules.

15. The method according to claim 9, further comprising:
when a positive side of the low-voltage side DC bus has a short-term failure to ground or to the neutral point, adjusting a switching state of the power modules composed of the full-bridge plus capacitor structures of the voltage source converters between the low-voltage DC ports in all the Type-I valve group series; and
after the failure is repaired, restoring the switching state of the modules.

16. The method according to claim 9, further comprising:
when a negative side of the low-voltage side DC bus has a short-term failure to ground or to the neutral point, adjusting a switching state of the power modules composed of the full-bridge plus capacitor structures of the voltage source converters between the low-voltage DC ports in all the Type-II valve group series; and
after the failure is repaired, restoring the switching state of the modules.

17. The method according to claim 9, further comprising:
when a positive side of the low-voltage side DC bus has a permanent failure to ground or to the neutral point, locking the Type-I valve group series, and opening the isolating switches or full-control switches connected to the positive electrodes and the negative electrodes of the high-voltage DC port and the low-voltage DC port of the Type-I valve group series to isolate the failure; and
keeping a working state of the Type-II valve group series unchanged, and continuing to perform electric energy conversion from the high-voltage DC bus to the negative side and neutral point of the low-voltage DC bus.

18. The method according to claim 9, further comprising:
when a negative side of the low-voltage side DC bus has a permanent failure to ground or to the neutral point, locking the Type-II valve group series, and opening the isolating switches or full-control switches connected to the positive electrodes and the negative electrodes of the high-voltage DC port and the low-voltage DC port of the Type-II valve group series to isolate the failure; and
keeping a working state of the Type-I valve group series unchanged, and continuing to perform electric energy conversion from the high-voltage DC bus to the positive side and neutral point of the low-voltage DC bus.

19. A device for controlling the bipolar bidirectional DC converter according to claim 8, comprising:
a normal working unit for controlling the isolating switches connected to the positive electrodes and the negative electrodes of the high-voltage DC ports and the low-voltage DC ports of all the valve group series to close when the bipolar bidirectional DC converter works normally
a first detecting unit for detecting a first potential different between the positive electrode of the low-voltage DC port and the negative electrode of the low-voltage DC port of the Type-I valve group series, and enabling a first adjusting unit when the first potential difference deviates from a first target value;
the first adjusting unit for adjusting the power transmitted through the magnetic elements by the voltage source converters of the Type-I valve group series till the first potential difference is equal to the first target value, wherein the voltage source converters are located between the positive electrode of the low-voltage DC port and the negative electrode of the low-voltage DC port of the Type-I valve group series or between the positive electrode of the low-voltage DC port and the positive electrode of the high-voltage DC port of the Type-I valve group series;
a second detecting unit for detecting a second potential difference between the negative electrode of the low-voltage DC port and the negative electrode of the high-voltage DC port of the Type-I valve group series, and enabling a second adjusting unit when the second potential difference deviates from a second target value;
a second adjusting unit for adjusting the power transmitted through the magnetic elements by the voltage source converters of the Type-I valve group series till the second potential difference is equal to the second target value, wherein the voltage source converters are located between the positive electrode of the low-voltage DC port and the negative electrode of the low-voltage DC port of the Type-I valve group series or between the negative electrode of the low-voltage DC port and the negative electrode of the high-voltage DC port of the Type-I valve group series;
a third detecting unit for detecting a third potential difference between the positive electrode of the low-voltage DC port and the negative electrode of the low-voltage DC port of the Type-II valve group series, and enabling the third adjusting unit when the third potential difference deviates from a third target value;
a third adjusting unit for adjusting the power transmitted through the magnetic elements by the voltage source converters of the Type-II valve group series till the third potential difference is equal to the third target value, wherein the voltage source converters are located between the positive electrode of the low-voltage DC port and the negative electrode of the low-voltage DC port of the Type-II valve group series or between the negative electrode of the low-voltage DC port and the negative electrode of the high-voltage DC port of the Type-II valve group series;
a fourth detecting unit for detecting a fourth potential difference between the negative electrode of the low-voltage DC port and the negative electrode of the high-voltage DC port of the Type-II valve group series, and enabling the fourth adjusting unit when the fourth potential difference deviates from a fourth target value;
a fourth adjusting unit for adjusting the power transmitted through the magnetic elements by the voltage source converters of the Type-II valve group series till the fourth potential difference is equal to the fourth target value, wherein the voltage source converters are located between the positive electrode of the low-voltage DC port and the negative electrode of the low-voltage DC port of the Type-II valve group series or between the positive electrode of the low-voltage DC port and the positive electrode of the high-voltage DC port of the Type-II valve group series;
a high-voltage DC bus short-term failure handling unit, wherein when the high-voltage DC bus has a short-term failure, the high-voltage DC bus short-term failure handling unit adjusts a switching state of the power modules composed of the full-bridge plus capacitor structures in all the valve group series, and restores the switching state of the modules after the failure is repaired;

a low-voltage side DC bus positive side short-term failure handling unit, wherein when a positive side of the low-voltage side DC bus has a short-term failure to ground or to the neutral point, the low-voltage side DC bus positive side short-term failure handling unit adjusts a switching state of the power modules composed of the full-bridge plus capacitor structures of the voltage source converters between the low-voltage DC ports in all the Type-I valve group series, and restores the switching state of the modules after the failure is repaired;

a low-voltage side DC bus negative side short-term failure handling unit, wherein when a negative side of the low-voltage side DC bus has a short-term failure to ground or the neutral point, the low-voltage side DC bus negative side short-term failure handling unit adjusts a switching state of the power modules composed of the full-bridge plus capacitor structures of the voltage source converters between the low-voltage DC ports in all the Type-II valve group series, and restores the switching state of the modules after the failure is repaired, a low-voltage side DC bus positive side permanent failure handling unit for locking the Type-I valve group series, opening the isolating switches or full-control switches connected to the positive electrodes and the negative electrodes of the high-voltage DC port and the low-voltage DC non of the Type-I valve group series to isolate the failure when a positive side of the low-voltage side DC bus has a permanent failure to ground or to the neutral point, keeping a working state of the Type-II valve group series unchanged, and continuing to perform the eclectic energy conversion from the high-voltage DC bus to the negative side and neutral point of the low-voltage DC bus; and a low-voltage side DC bus negative side permanent failure handling unit for locking the Type-II valve group series, opening the isolating switches or full-control switches connected to the positive electrodes and the negative electrodes of the high-voltage DC port and the low-voltage DC port of the Type-II valve group series to isolate the failure when a negative side of the low-voltage side DC bus has a permanent failure to ground or to the neutral point, keeping a working state of the Type-I valve group series unchanged, and continuing to complete the electric energy conversion from the high-voltage DC bus to the positive side and neutral point of the low-voltage DC bus.

20. The bipolar bidirectional DC converter according to claim 1, wherein the magnetic elements are reactors or AC transformers.

* * * * *